United States Patent [19]

Adachi et al.

[11] Patent Number: 5,387,836
[45] Date of Patent: Feb. 7, 1995

[54] RARE EARTH OXYSULFIDE PHOSPHOR AND HIGH RESOLUTION CATHODE RAY TUBE EMPLOYING IT

[75] Inventors: Ryuji Adachi; Hideo Tono, both of Odawara, Japan

[73] Assignee: Kasei Optonix, Ltd., Tokyo, Japan

[21] Appl. No.: 939,726

[22] Filed: Sep. 2, 1992

[30] Foreign Application Priority Data

Sep. 3, 1991 [JP] Japan .................................. 3-222998

[51] Int. Cl.⁶ .............................................. H01J 29/20
[52] U.S. Cl. .................................. 313/468; 252/301.4 S
[58] Field of Search ..................... 292/301.4 S; 313/468

[56] References Cited

U.S. PATENT DOCUMENTS 4,624,861 11/1986 Yale et al. ..................... 252/301.4 S

FOREIGN PATENT DOCUMENTS 0229189 7/1987 European Pat. Off. .
1800671 7/1969 Germany .

OTHER PUBLICATIONS

Database WPIL, Derwent Publications Ltd., AN 80-54340C, & JP-A-55 080 485, Jun. 18, 1980, "Indicator Tube Luminescing Red Under Electron Excitation—Has An Anode Coated with Stannic Oxide and Europium-Activated Yttrium-Lanthanum-Gadolinium Oxide, Sulphide or Vanadate".

*Primary Examiner*—Jack Cooper
*Attorney, Agent, or Firm*—Oblon, Spivak, McClelland, Maier & Neustadt

[57] ABSTRACT

A rare earth oxysulfide phosphor of the formula $(Ln_{1-x-y}La_xLn'_y)_2O_2S$ wherein Ln is at least one element selected from the group consisting of Y, Gd, Sc and Lu, Ln' is at least one element selected from the group consisting of Eu, Tb, Sm, Er, Tm, Dy, Ho, Nd and Pr, and x and y are numbers within ranges of $0.005 < x \leq 0.07$ and $0.0001 \leq y \leq 0.2$, respectively.

11 Claims, 1 Drawing Sheet

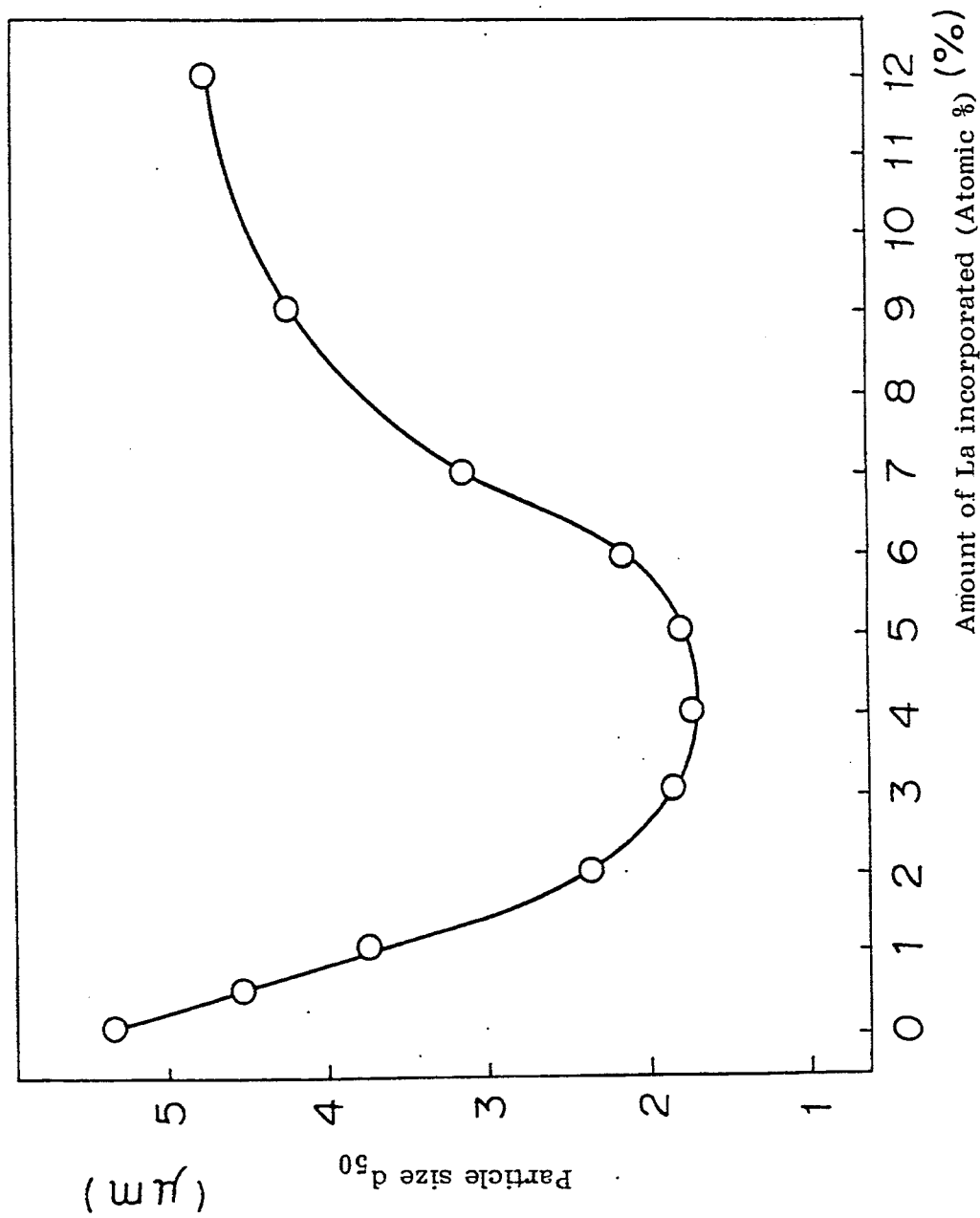

RARE EARTH OXYSULFIDE PHOSPHOR AND HIGH RESOLUTION CATHODE RAY TUBE EMPLOYING IT

The present invention relates to a rare earth oxysulfide phosphor and a high resolution cathode ray tube employing it.

A rare earth oxysulfide phosphor, such as $Y_2O_2S:Eu$, is widely used as a red-emitting phosphor for a color cathode ray tube, and $Gd_2O_2S:Tb$ is widely used as a green-emitting phosphor for a projection picture tube.

A phosphor of this type is known to be produced by a method wherein rare earth oxide starting materials $Ln_2O_3$ and $Ln'_2O_3$ are once dissolved in a mineral acid, then reacted with oxalic acid (HOOC—COOH) and coprecipitated in the form of the respective oxalates, which are then heated and decomposed to a mixed crystal of $Ln_2O_3 \cdot Ln'_2O_3$, and a sulfurizing agent and a flux are added to the mixed crystal, followed by calcination. The calcination temperature is at a level of from 900° to 1,250° C., and the flux serves to accelerate the above reaction and to promote the growth of crystal particles.

The particle size of the phosphor is required to be varied depending upon the particular use. Heretofore, this has been done by adjusting the calcination temperature and the type and amount of the flux, as mentioned above.

In recent years, the trend for high resolution of a cathode ray tube has progressed, and it is now required to coat phosphor particles on a cathode ray tube in a smaller dot pattern or in a finer stripe pattern than ever. If a conventional phosphor is used to form a smaller dot pattern or a finer stripe pattern, the spaces among particles tend to be substantial since the phosphor particles are large, whereby the packing density of the picture elements (dot patterns or stripes) tend to be low, and the irregularities along the edges tend to be substantial, and the shapes of dots or stripes tend to be poor. These constitute a substantial obstacle to the development for a high level of resolution.

Especially in the case of a super high resolution cathode ray tube, it is necessary to use a phosphor having an average particle size of not more than 3 μm. However, according to the conventional technique, it has been a limit to obtain a phosphor having an average particle size of about 4 μm by forcible pulverization and classification of phosphor particles.

Heretofore, additives to obtain rare earth oxysulfide phosphors having relatively large particle size have been known (for example, Japanese Examined Patent Publication No. 35555/1976 and Japanese Unexamined Patent Publications No. 46182/1979 and No. 192484/1982). However, no additives to obtain a small particle size have been known. If it is attempted to obtain a phosphor having a relatively small particle size by changing e.g. the calcination temperature, the crystal growth tends to be inadequate as compared with a normal phosphor, whereby the brightness tends to be low, and the dispersibility as a powder property tends to be poor, and thus it has been difficult to form a phosphor layer with high density having a high luminance along the above object.

Further, for the application to a viewfinder or printing, a phosphor having a small particle (at a level of 2 μm) is required. However, no satisfactory process which fulfills such a requirement has been established, as mentioned above, and it has been obliged to use forcible pulverization or classification of phosphor particles to obtain a phosphor having a small particle size in a poor yield and with poor luminance.

The prior art references relating to the composition of the present invention, i.e. the prior art references disclosing rare earth oxysulfide phosphors having a part of the rare earth matrix substituted by lanthanum (La), include Japanese Examined Patent Publications No. 33743/1974, No. 33744/1974 (U.S. Pat. No. 3,418,246) and No. 6106/1976. These prior art references suggest that a part of rare earth elements can be substituted by La in an extremely wide range. However, none of them suggests the substitution by a very limited small amount of La as in the present invention, and the Examples given in these references are far apart from the scope of the present invention. Needless to say, there is no disclosure which may suggest the effects of the present invention. Further, Japanese Unexamined Patent Publication No. 15793/1975 discloses that an unexpected effect of enlarging the particle size of a phosphor is obtained by the substitution with La in an amount within a certain specified range (from 0.005 to 0.1 atomic %) which is substantially smaller than the small amount specified in the present invention.

It is an object of the present invention to solve the above-mentioned problems and to provide a rare earth oxysulfide phosphor having a high luminance and a small particle size of at most 3 μm.

The present invention provides a rare earth oxysulfide phosphor of the formula $(Ln_{1-x-y}La_xLn'_y)_2O_2S$ wherein Ln is at least one element selected from the group consisting of Y, Gd, Sc and Lu, Ln' is at least one element selected from the group consisting of Eu, Tb, Sm, Er, Tm, Dy, Ho, Nd and Pr, and x and y are numbers within ranges of $0.005 < x \leq 0.07$ and $0.0001 \leq y \leq 0.2$, respectively.

The present invention also provides a high resolution cathode ray tube having a fluorescent screen containing the above rare earth oxysulfide phosphor which contains Eu or Tb as the main activating agent and which has an average particle size of at most 3 μm.

In the accompanying drawing, FIG. 1 is a graph showing the relation between the amount (atomic %) of lanthanum and the particle size ($d_{50}$) of the phosphor.

Now, the present invention will be described in detail with reference to the preferred embodiments.

When a rare earth sulfide phosphor is prepared by mixing a sulfurizing agent and a flux to a rare earth oxide, followed by heating, the particle growth of the phosphor is influenced by the sulfurizing agent, the flux and the calcination temperature. Therefore, the particle size control used to be conducted mainly by selecting the type and amount of the flux and the calcination temperature. However, by such a method, it has been impossible to obtain a phosphor having a small particle size of less than 4 μm although it was possible to control the particle size over 4 μm.

Under these circumstances, present inventors have conducted extensive researches for an additive which has not been known and which is capable of controlling the particle size to a small level, completely departing from the conventional idea of controlling the particle size, and as a result, have found that an addition of a very small amount of La as a rare earth element to a crystal matrix of an oxysulfide of a rare earth element such as Y, Gd, Sc or Lu, is effective for controlling the growth of the crystal particles during the crystal formation. Namely, the present invention is based on a discovery that by an addition of La in an amount within a range of more than 0.5 atomic % to 7 atomic % to a rare earth oxysulfide phosphor composition, it is possible to produce a rare earth oxysulfide phosphor having a small particle size of at most 3 μm, which has been impossible to produce by the conventional method. In the present invention, it is possible to produce a rare earth oxysulfide phosphor having an average particle size of from 1 to 3 μm under a stabilized condition.

As shown by the relation between the amount of La and the average particle size in FIG. 1, the average particle size can remarkably be reduced by incorporating La in an amount within the limited range.

FIG. 1 represents a case where La was incorporated in the form of lanthanum oxide to the phosphor raw material. However, as shown in the following Examples, when La is added in the form of a precipitate formed by coprecipitation with at least one member of the main raw material, it is possible to obtain the effect of the present invention to obtain the same small particle size with a less amount of La.

Accordingly, the effect of the present invention can be obtained when x is a number within a range of from $0.005 < x \leq 0.07$.

Further, there is a tendency such that as the La content increases, the value x in the emission color CIE chromaticity diagram of the phosphor decreases. Accordingly, for the purpose of controlling the emission color or increasing the color purity, it is preferred to adopt a low value for the La content.

Further, the present inventors have conducted an experiment to examine the stability of a slurry of the phosphor of the present invention in an aqueous solution of a binder and to examine various properties of a fluorescent layer obtained by using such a phosphor slurry. As a result, it has been found that the smaller the content of La, the better also from this viewpoint.

From the foregoing viewpoints, the La content in the phosphor of the present invention, e.g. the value x, is preferably within a range of from 0.6 to 5 atomic %. Particularly when a high color purity is to be maintained, the La content should preferably be within a range of more than 0.5 atomic % to 4 atomic %, more preferably within a range of from 0.6 to 3 atomic %. Such a range is preferred also for the stability of the slurry. Further, in consideration of the particle size distribution from the production point of view, the La content is preferably from 0.7 to 5 atomic %, more preferably from 0.8 to 4 atomic %.

From the viewpoint of the above various properties, in the present invention, it is preferred to employ a co-crystallized raw material obtained by e.g. coprecipitation of La with at least one of other rare earth elements specified above.

On the other hand, if an attention is drawn only to the particle size of the resulting phosphor, in order to maintain the average particle size of the rare earth oxysulfide phosphor to a level of at most 2 μm constantly, it is preferred to have the value x in the above formula maintained within a range of from 1 to 6 atomic %, more preferably from 1.8 to 5.5 atomic %. If La is added beyond the upper limit of the present invention, the crystal growth tends to be inadequate, whereby reagglomeration tends to take place, and the average particle size of such agglomerates will be at least 4 μm, and the quality of such a product is not suitable for a high resolution cathode ray tube, although in some cases fine single particles having a particle size of at most 3 μm may be obtained. The above-mentioned substitution by La is effective for controlling the particle size, the growth of the host crystals, and such an effect can be obtained without being substantially influenced by the type of the activating agent.

Thus, according to the present invention, such an effect is obtained in a well-known phosphor wherein at least one element selected from the group consisting of Eu, Tb, Sm, Er, Tm, Dy, Ho, Nd and Pr is included as the activating agent. The present invention will be applied to a practical phosphor wherein Ln' contains at least Eu or Tb and Ln is at least Y or Gd.

As the raw material, a lanthanum compound such as lanthanum oxalate, lanthanum carbonate, lanthanum nitrate or lanthanum sulfite may be used instead of lanthanum oxide. Further, as a method of addition, it is possible to employ a method wherein the above-mentioned La compound is added to the main raw material. Otherwise, it is possible to employ a method wherein the La compound is precipitated in the main raw material by coprecipitation to uniformly distribute La, whereby the obtained phosphor exhibits an excellent effect as described above.

By the incorporation of lanthanum oxide, there is a certain change in the color as compared with the phosphor without such incorporation, but such a color change can sufficiently be adjusted by controlling the amount of the activating agent. Thus, it can be applied to a high resolution cathode ray tube without any substantial practical problem. The average particle size ($d_{50}$) of the phosphor of the present invention was measured by Coulter Counter Model TA-II (manufactured by Coulter Company) after dispersing the phosphor in an aqueous electrolyte, followed by supersonic dispersion treatment.

Now, the present invention will be described in further detail with reference to Examples and Comparative Examples. However, it should be understood that the present invention is by no means restricted by such specific Examples.

EXAMPLES 1 TO 3 AND COMPARATIVE EXAMPLES 1 TO 4

$Y_2O_3$, $Eu_2O_3$ and $La_2O_3$ were blended in the proportions as identified in Table 1, and the proportion of La for substitution was changed within a range of from 0.5 to 12 atomic %. Further, to each mixture, 138 g of S, 96 g of $Na_2CO_3$ and 15 g of $K_3PO_4$ were thoroughly mixed, and the mixture was put into an alumina crucible and calcined at 1,080° C. for one hour. The calcined product was dissolved in water, and washing was repeated. Further, the remaining alkali content was neutralized with nitric acid. Then, dispersion treatment was conducted in a ball mill, followed by filtration for removal of water, followed by drying at 120° C. for 10 hours. Then, sieving was conducted with a sieve of 150 mesh.

The phosphor of Example 1 thus obtained was a red-emitting phosphor of the formula $(Y_{0.929}La_{0.030}Eu_{0.041})_2O_2S$, and the phosphor of Example 3 was a red-emitting phosphor of the formula $(Y_{0.899}La_{0.060}Eu_{0.041})_2O_2S$.

Further, a phosphor of Example 2 of the formula $(Y_{0.929}La_{0.030}Eu_{0.041})_2O_2S$ was prepared in the same manner as above except that a mixed crystal of $Y_2O_3 \cdot Eu_2O_3 \cdot La_2O_3$ prepared by coprecipitating La in the form of an oxalate together with $Y_2O_3$ and $Eu_2O_3$, followed by heat decomposition, was used as the raw material.

Further, for the purpose of comparison, a red-emitting phosphor (Comparative Example 1) of the formula $(Y_{0.959}Eu_{0.041})_2O_2S$ was prepared under the same conditions as in Example 1 except that $La_2O_3$ was omitted from the above raw material composition. Further, as shown in Table 1, $La_2O_3$ was incorporated in a La proportion outside the range of the present invention under the same conditions as in Example 1 to obtain a red-emitting phosphor (Comparative Example 2) of the formula $(Y_{0.954}La_{0.005}Eu_{0.041})_2O_2S$, a red-emitting phosphor (Comparative Example 3) of the formula $(Y_{0.869}La_{0.090}Eu_{0.041})_2O_2S$, and a red-emitting phosphor (Comparative Example 4) of the formula $(Y_{0.839}La_{0.120}Eu_{0.041})_2O_2S$.

TABLE 1

|  | Amount of La (atomic %) | $Y_2O_3$ (%) | $La_2O_3$ (%) | $Eu_2O_3$ (%) |
| --- | --- | --- | --- | --- |
| Comparative Example 1 | 0 | 300.0 | 0 | 20.1 |
| Comparative Example 2 | 0.5 | 297.8 | 2.2 | 20.1 |
| Example 1 | 3 | 287.4 | 12.6 | 20.1 |
| Example 2 | 3 | 287.4 | 12.6 | 20.1 |
| Example 3 | 6 | 276.4 | 23.6 | 20.1 |
| Comparative Example 3 | 9 | 266.7 | 33.3 | 20.1 |
| Comparative Example 4 | 12 | 258.1 | 41.9 | 20.1 |

TABLE 2

|  | Amount of La (atomic %) | Particle size $d_{50}$ (μm) | Chromaticity (x/y) | Brightness (%) | Screen properties | |
|  |  |  |  |  | Packing density | Shape of dots |
| --- | --- | --- | --- | --- | --- | --- |
| Comparative Example 1 | 0 | 5.3 | 0.656/0.336 | 100 | Δ | Δ |
| Comparative Example 2 | 0.5 | 4.5 | 0.655/0.337 | 101 | Δ~○ | Δ |
| Example 1 | 3 | 1.8 | 0.650/0.340 | 104 | ○ | ○ |
| Example 2 | 3 | 1.6 | 0.653/0.339 | 102 | ○ | ○ |
| Example 3 | 6 | 2.2 | 0.647/0.342 | 94 | ○ | ○ |
| Comparative Example 3 | 9 | 4.3 | 0.645/0.344 | 88 | Δ | Δ |
| Comparative Example 4 | 12 | 4.8 | 0.645/0.344 | 81 | Δ | x | x: Poor, Δ: Fair, ○: Good

The properties of these phosphors are compared in Table 2. Particularly when the phosphors are applied to cathode ray tubes with high resolution patterns to examine the coating properties (screen properties), the phosphors of Examples 1 to 3 have particle sizes smaller than the phosphors of Comparative Examples 1 to 4, whereby dense phosphor layers could be formed, and such phosphor layers were excellent in both the packing density and the dot shape. When comparison is made on the basis of the amount of La incorporated, the effect of reducing the particle size of the phosphor is inadequate in the case where La is not higher than 0.5 atomic %, and in a case where La is higher than 9 atomic %, the growth of the crystal particles tends to be inadequate, and the crystal shape and the dispersibility tend to be poor, whereby reagglomeration tends to take place, and consequently the coating properties (screen properties) tend to be poor.

Further, phosphors were prepared under the same condition as in Example 1 except that the amount of lanthanum oxide was varied, and the relation between the amount and the particle size of the phosphor was as shown by the graph in FIG. 1.

In a case where a mixed crystal of La with at least one member of the raw material was used as the starting material, as shown in Example 2, it was possible to make the particle size ($d_{50}$) small as compared with the case of Example 1. Further, to obtain the same particle size ($d_{50}$), it was possible to reduce the amount of La when the above mixed crystal was used as the starting material.

Further, a very small amount of Tb or Sm was added as a coactivator to the above phosphors, and the same experiments were conducted, whereby the same effects were obtained.

Further, a high resolution color cathode ray tube having fluorescent layers comprising a red-emitting phosphor of the present invention having an average particle size of at most 3 μm, a blue-emitting phosphor (ZnS:Ag,Al ZnS:Ag,Cl etc.) having an average particle size of at most 3 μm and a green-emitting phosphor (ZnS:Cu,Al, ZnS:Cu,Au,Al etc.) having an average particle size of at most 3 μm, respectively, shows an excellent display.

EXAMPLE 4 AND COMPARATIVE EXAMPLE 5

A composition comprising 95 g of $Gd_2O_3$, 1.5 g of $Tb_4O_7$, 46 g of S, 32 g of $Na_2CO_3$, 13 g of $K_3PO_4$ and 5 g of $La_2O_3$, was thoroughly mixed, put into an alumina crucible and calcined at 1,100° C. for one hour, followed by the same treatment as in Example 1 to obtain a green-emitting phosphor of Example 4.

The obtained phosphor of Example 4 was a green-emitting phosphor of the formula $(Gd_{0.930}La_{0.055}Tb_{0.015})_2O_2S$. For the purpose of comparison, a green-emitting phosphor (Comparative Example 5) of the formula $(Gd_{0.985}Tb_{0.015})_2O_2S$ was prepared under the same conditions as in Example 4 except that $La_2O_3$ was omitted from the above-mentioned composition of the raw material. The properties of these phosphors were compared as shown in Table 3. When the phosphor of Example 4 was applied to a cathode ray tube of a high resolution pattern, and the coating properties were examined, it was found that a dense fluorescent layer was formed, and the fluorescent layer was excellent in both the packing density and the dot shape.

TABLE 3

|  | Amount of La (atomic %) | Particle size d$_{50}$ (μm) | Chromaticity (x/y) | Brightness (%) | Screen properties | |
|---|---|---|---|---|---|---|
|  |  |  |  |  | Packing density | Shape of dots |
| Comparative Example 4 | 5.5 | 2.6 | 0.335/0.563 | 101 | ○ | ○ |
| Comparative Example 5 | 0 | 6.3 | 0.334/0.561 | 100 | Δ | Δ |

EXAMPLE 5 AND COMPARATIVE EXAMPLE 6

A composition comprising 95 g of $Y_2O_3$, 6.7 g of $Eu_2O_3$, 46 g of S, 32 g of $Na_2CO_3$, 13 g of $K_3PO_4$ and 5 g of $La(NO_3)_3$, was thoroughly mixed, put into an alumina crucible and calcined at 1,100° C. for one hour, followed by the same treatment as in Example 1 to obtain a red-emitting phosphor of Example 5.

The obtained phosphor of Example 5 was a red-emitting phosphor of the formula $(Y_{0.940}La_{0.020}Eu_{0.040})_2O_2S$. For the purpose of comparison, a red-emitting phosphor (Comparative Example 6) of the formula $(Y_{0.960}Eu_{0.040})_2O_2S$ was prepared under the same conditions as in Example 5 except that $La(NO_3)_3$ was omitted from the above composition of the raw material. The properties of these phosphors were compared as shown in Table 4.

Further, a very small amount of Dy was added as a coactivator to the above phosphors, and the experiments were conducted in the same manner, whereby the same effects were obtained.

TABLE 4

|  | Amount of La (atomic %) | Particle size d$_{50}$ (μm) | Chromaticity (x/y) | Brightness (%) | Screen properties | |
|---|---|---|---|---|---|---|
|  |  |  |  |  | Packing density | Shape of dots |
| Example 5 | 2 | 2.5 | 0.655/0.336 | 100 | ○ | ○ |
| Comparative Example 6 | 0 | 5.3 | 0.656/0.336 | 100 | Δ | Δ | x: Poor, Δ: Fair, ○: Good

EXAMPLE 6 AND COMPARATIVE EXAMPLE 7

A composition comprising 200 g of $Y_2O_3$, 0.83 g of $Tb_4O_7$, 90 g of S, 70 g of $Na_2CO_3$, 29 g of $K_3PO_4$ and 6 g of $La_2O_3$, was thoroughly mixed, put into an alumina crucible and calcined at 1,100° C. for one hour, followed by the same treatment as in Example 1 to obtain a white-emitting phosphor of Example 6.

The obtained phosphor of Example 6 was a white-emitting phosphor of the formula $(Y_{0.978}La_{0.020}Tb_{0.002})_2O_2S$. For the purpose of comparison, a white-emitting phosphor (Comparative Example 7) of the formula $(Y_{0.998}Tb_{0.002})_2O_2S$ was prepared under the same conditions as in Example 6 except that $La_2O_3$ was omitted from the above composition of the raw material. The properties of these phosphors were compared as shown in Table 5. The phosphor of Example 6 is small particles with a particle size of 2.1 μm, whereby a fine fluorescent layer was prepared, and when applied to a viewfinder, an excellent image was obtained.

TABLE 5

|  | Amount of La (atomic %) | Particle size d$_{50}$ (μm) | Chromaticity (x/y) | Brightness (%) |
|---|---|---|---|---|
| Example 6 | 2 | 2.1 | 0.248/0.301 | 100 |
| Comparative Example 7 | 0 | 4.4 | 0.248/0.301 | 100 |

According to the present invention, it is possible to present a rare earth oxysulfide phosphor having a small particle size of at most 3 μm by adopting the above described construction, and it has been made possible to easily form a fluorescent layer suitable for a high resolution cathode ray tube.

We claim:

1. A rare earth oxysulfide phosphor of the formula $(Ln_{1-x-y}La_xLn'_y)_2O_2S$ wherein Ln is at least one element selected from the group consisting of Y, Gd, Sc and Lu, Ln' is at least one element selected from the group consisting of Eu, Tb, Sm, Er, Tm, Dy, Ho, Nd and Pr, and x and y are numbers within ranges of $0.005 < x \leq 0.07$ and $0.0001 \leq y \leq 0.2$, respectively wherein said rare earth oxysulfide phosphor has an average particle size of at most 3 μm.

2. The rare earth oxysulfide phosphor according to claim 1, wherein x is a number within a range of from 0.006 to 0.05.

3. The rare earth oxysulfide phosphor according to claim 1, wherein x is a number within a range of from 0.008 to 0.04.

4. The rare earth oxysulfide phosphor according to claim 1, wherein Ln' contains at least Eu or Tb, and Ln contains at least Y or Gd.

5. The rare earth oxysulfide phosphor according to claim 1, wherein Ln' contains Eu, and Ln is Y.

6. A rare earth oxysulfide phosphor as claimed in claim 1, wherein Ln is Sc.

7. A rare earth oxysulfide phosphor as claimed in claim 1, wherein Ln is Lu.

8. A high resolution cathode ray tube having a fluorescent screen which contains a rare earth oxysulfide phosphor of the formula $(Ln_{1-x-y}La_xLn'_y)_2O_2S$ wherein Ln is at least one element selected from the group consisting of Y, Gd, Sc and Lu, Ln' is at least one element selected from the group consisting of Eu, Tb, Sm, Er, Tm, Dy, Ho, Nd and Pr, and x and y are numbers within ranges of $0.005 < x \leq 0.07$ and $0.0001 \leq y \leq 0.2$, respectively wherein said rare earth oxysulfide phosphor has an average particle size of at most 3 μm.

9. The high resolution cathode ray tube according to claim 8, wherein x is a number within a range of from 0.008 to 0.04.

10. The high resolution cathode ray tube according to claim 8, wherein Ln' contains Eu, and Ln is Y.

11. The high resolution cathode ray tube according to claim 8, wherein the fluorescent screen comprises red-, blue- and green-emitting components, wherein the red-emitting component is a phosphor of the formula $(Y_{1-x-y}La_xEu_y)_2O_2S$, the blue-emitting component is ZnS,Ag,Al and the green-emitting component is ZnS:Cu,Al.

* * * * *